United States Patent
Flores Sanchez et al.

(10) Patent No.: US 10,478,801 B2
(45) Date of Patent: Nov. 19, 2019

(54) PROCESS FOR OBTAINING ADSORBENT MATERIAL BASED ON POROUS SILICATES FOR REDUCTION OF SULFUR AND NITROGEN IN OIL FRACTIONS

(71) Applicant: INSTITUTO MEXICANO DEL PETROLEO, Mexico City (MX)

(72) Inventors: Patricia Flores Sanchez, Mexico City (MX); Jose Manuel Dominguez Esquivel, Mexico City (MX); Jorge Arturo Aburto Anell, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 100 days.

(21) Appl. No.: 15/904,750

(22) Filed: Feb. 26, 2018

(65) Prior Publication Data

US 2018/0178196 A1 Jun. 28, 2018

Related U.S. Application Data

(62) Division of application No. 14/062,522, filed on Oct. 24, 2013, now Pat. No. 10,010,864.

(30) Foreign Application Priority Data

Oct. 24, 2012 (MX) .................... MX/a/2012/012376

(51) Int. Cl.
| | |
|---|---|
| *B01J 20/32* | (2006.01) |
| *C01G 25/00* | (2006.01) |
| *C10G 55/06* | (2006.01) |
| *B01J 20/30* | (2006.01) |
| *B01J 20/28* | (2006.01) |
| *B01J 20/10* | (2006.01) |
| *B01J 20/34* | (2006.01) |
| *C10G 25/00* | (2006.01) |

(52) U.S. Cl.
CPC .......... *B01J 20/3236* (2013.01); *B01J 20/10* (2013.01); *B01J 20/28064* (2013.01); *B01J 20/305* (2013.01); *B01J 20/3071* (2013.01); *B01J 20/3078* (2013.01); *B01J 20/3085* (2013.01); *B01J 20/3204* (2013.01); *B01J 20/3433* (2013.01); *C10G 25/003* (2013.01); *C10G 55/06* (2013.01); *C10G 2300/202* (2013.01)

(58) Field of Classification Search
CPC .............. B01J 20/3236; B01J 20/3204; B01J 20/3071; B01J 20/10; B01J 20/28064; B01J 20/3085; B01J 20/3078; B01J 20/3433; B01J 20/305; C10G 55/06; C10G 25/003; C10G 2300/202
See application file for complete search history.

(56) References Cited

U.S. PATENT DOCUMENTS

| | | |
|---|---|---|
| 6,699,797 B1 | 3/2004 | Morris et al. |
| 2004/0052714 A1 | 3/2004 | Rojas et al. |
| 2004/0144726 A1 | 7/2004 | Chmelka et al. |
| 2005/0107624 A1 | 5/2005 | Lin et al. |
| 2006/0118490 A1 | 6/2006 | Landry et al. |
| 2010/0304139 A1 | 12/2010 | Chang et al. |
| 2018/0029022 A1* | 2/2018 | Pereira Almao ..... B01J 35/0006 |

OTHER PUBLICATIONS

Dongyuan Zhao et al. "Triblock Copolymer Syntheses of Mesoporous Silica with Periodic 50 to 300 Angstrom Pores," Science, vol. 279 (1998) pp. 548-552.
Maurizo Muniz-Miranda, "Silver-doped silica colloidal nanoparticles. Characterization and optical measurements," Colloids and Surfaces A: Physicochem. Eng. Aspects 217 (2003) pp. 185-189.
Luck, F., A Review of Support Effects on the Activity and Selectivity of Hydrotreating Catalysts, Bull. Soc. Chim. Belg., vol. 100, No. 11-12 (1991) 781-800.
Corma, A. et al., Optimization of SOx additives of FCC catalysts based on MgO—Al2O3 mixed oxides produced from hydrotalcites, Applied Catalysis B: Environmental 4 (1994) 29-43.
Wang, J.A. et al., Evaluation of crystalline structure and SO2 storage capacity of a series of composition-sensitive De-SO2 catalysts, Journal of Molecular Catalysis A: Chemical 194 (2003) 181-193.
Mikhail, S. et al., Desulfurization by an economically adsorption technique, Applied Catalysis A: General 227 (2002) 265-278.
Myrstad, T. et al., Effect of nickel and vanadium on sulphur reduction of FCC naphtha, Applied Catalysis A: General 192 (2000) 299-305.
Dominguez, J.M. et al., High throughput study on the induction of radial distribution of nanotubes and spherical morphology in silica particles by short-chain polar co-solvents, Microporous and Mesoporous Materials 66 (2003) 341-348.

* cited by examiner

*Primary Examiner* — Peter F Godenschwager
*Assistant Examiner* — Andrew J. Oyer
(74) *Attorney, Agent, or Firm* — Dickinson Wright PLLC

(57) ABSTRACT

The present invention relates to the process of obtaining adsorbent materials based upon supported metal species on porous silicates, and their use for reducing the amount of sulfur and nitrogen contaminants in petroleum fractions and products derived of, i.e., light and heavy gas oils, FCC gasoline and fuels, where FCC stands for Fluid Catalytic Cracking process. The invention comprises the selection, preparation, modification and adsorptive properties of the abovementioned porous materials, which are based on porous silicates with metal species intercalated and/or impregnated, such as Ti(O,OH), Mg(O, OH)—, Zr(O, OH)—, Fe(O, OH), Al(O, OH). Also, additional options were considered, for example those comprising metals from the $1^{st}$ and $2^{nd}$ transition series, such as $Cu^+$, $Ni^{2+}$, $Zn^{2+}$, $Fe^{2+}$, $Ag^+$, $Co^{2+}$, $Ti^{4+}$, $V^{2+,5+}$, $Cr^{3+}$ and $Mn^{2+}$.

20 Claims, 1 Drawing Sheet

PROCESS FOR OBTAINING ADSORBENT MATERIAL BASED ON POROUS SILICATES FOR REDUCTION OF SULFUR AND NITROGEN IN OIL FRACTIONS

This application is a divisional application of U.S. patent application Ser. No. 14/062,522 filed Oct. 24, 2013, which claims priority to Mexican Application No. MX/a/2012/012376 filed Oct. 24, 2012, which are incorporated by reference in their entirety.

FIELD OF THE INVENTION

The present invention relates to a process for obtaining porous silicate-based adsorbents and their use in the reduction of sulfur and nitrogen contaminants in petroleum fractions: light and heavy gas oils, gasoline and fuels, gasoline derived from FCC process (Fluid Catalytic Cracking).

The invention comprises the selection, preparation, modification and adsorptive properties of porous materials based on silicates which are intercalated and/or impregnated with, metal species such as $Ti(O,OH)_4^{4-}$, $Mg(O,OH)^-$, $Zr(O,OH)_4^{4-}$, $Fe(O,OH)_2^{2}$, $Al(O,OH)_3^{3-}$. Also, other are considered, for example those comprising metals from the 1st and 2nd transition series, such $Cu^+$, $Ni^{2+}$, $Zn^{2+}$, $Fe^{2+}$, $Ag^+$, $Co^{2+}$, $Ti^{4+}$, $V^{2+,5+}$, $Cr^{3+}$ and $Mn^{2+}$.

BACKGROUND OF THE INVENTION

Environmental standards have enforced the oil industry to reduce the sulfur content in gasoline to a maximum value of 50 ppm by 2010, and further, to a maximum sulfur content of 10 ppm. This has motivated the search of materials and processes to comply the environmental laws on clean fuels, for which we considered a variety of options that involve the following:

(1) The use of new and more efficient catalysts, with more resistance to deactivation caused by severe operating conditions in the refining plants, such as $T>375°$ C. and $P>54$ $Kg/cm^2$ in the hydrotreating processes HDT, according to the design limits of the plants (F. Luck, Bull. Soc. Chim. Belg., 100, 11-12, (1991) 781; A. Corma, A. E. Palomares, F. Rey, Appl. Catal. B, 4 (1994) 169; and J. A. Wang, L. F. Chen, R. Limas-Ballesteros, A. Montoya, J. M. Domínguez, J. Molec Catal A: Chemical, 194 (2003) 181-193).

(2) Less severe operation conditions, for example the use of flow space velocities (LHSV) lower than those currently used, as well as higher capacity reactors (2-3 times the current capacity) to increase the contact time ($\tau=m/F$) of the reactants with the catalyst active sites.

(3) The adsorption of sulfur and nitrogen contaminants that are present in FCC gasoline, using selective adsorbents (S. Mikhail, T. Zaki, L. Khalil, Appl Catal A: General, Vol 227, 1-2, 265-278 (2002); and "Effect of nickel and vanadium on sulfur reduction of FCC naphtha", Appl Catal A: General, Vol 192, 2 (2000) 299-305).

In all cases, knowledge of the composition of FCC gasoline is a fundamental point of departure, for developing and implementing the technologies as mentioned. Generally, the gasoil fractions are fed to the FCC process reactors, which may be variable mixtures of light and heavy gas oils, which have a sulfur content higher than 2,000 ppm and about 1,291 ppm of nitrogen. However, due to the cracking and recombination processes that occur in the FCC reactor, the sulfur content in the product generally contains about 1,500 ppm sulfur and 300 ppm nitrogen, when the feedstock exceeds these figures. Therefore, the composition of sulfur and nitrogen of the original molecules is modified, since a greater concentration of complex molecules, i.e., 1-,5-dimethyldibenzothiophene (1-,5-DMDBT); 4-,6-dimethyldibenzothiophene (4-,6-DMDBT); Carbazole, Quinoline, Indole, etc.; there is a predominance of thiophenes and benzothiophenes in the FCC products, amounting to about 1,500 ppm total sulfur and 300 ppm nitrogen in the FCC gasoline Apart the technology here stated, alternative technologies have emerged, such as the transformation process Octgain Exxon-Mobil; Octgain process, which is an example of a method for the nonselective desulfurization-hydrogenation reactions. A distinctive feature of this process is that by careful hydrogenation the level of desulfurization and an isomerization reaction of paraffins increase, which is used to offset the reduction in octane due to olefin saturation. Thus, the octane number is maintained at a minimum of 85 to 88 RON.

Table No. 1 shows the comparative operating conditions between the two processes, where one notes that the percentage of sulfur and nitrogen removal is similar in the two processes, but the process of the present invention achieves such removal level using operating conditions less severe than octgain process.

TABLE NO. 1 comparative operating conditions
Octgain Process vs Present Invention

|  | % Removal of sulfur | Operating Temperature (° C.) | Operating Pressure (atm) |
|---|---|---|---|
| Octgain Process | 90.3 | 400 | 40 |
| Present Invention | 90 | 25 | 1 |

Other alternative processes such as the use of catalysts for the purification of gas streams containing chlorine, fluorine, sulfur, nitrogen, mercury and silicon efficiently allow the removal of these components (i.e., sulfur and nitrogen), which are based upon the selective adsorption of sulfur and nitrogen molecules; these materials have a potential advantage further characterized by a low severity operation (eg., $T=0-25°$ C., $P=1$ atm.) while retaining the octane number of FCC gasoline.

From a molecular standpoint, typical fractions of diesel oil have properties that are similar to complex fluids, i.e., API density<22° API, Viscosity>1,000 cP, etc., with a typical high molecular weight composition of polyaromatic hydrocarbon molecules, i.e., MW>400, together with some associated heteroatoms, such as sulfur (S) and nitrogen (N), for example, carbazole, dibenzothiophene (DBT) and dimethyldibenzothiophene (DMDBT). The composition of these products is determined usually by separation and analysis techniques, for example short-path distillation (SPDA) with Simulated Distillation Chromatography (GCSD) and fractions separation (SARA) with high analytical performance (TLC-FID). Also there are other useful chromatographic techniques that are based on ion exchange or molecular diameters exclusion, in combination with some spectroscopic techniques like NMR, Tandem MS, MS, FI, EPR, etc.

Some heavy oils and diesel feeding the FCC process have a high proportion of polyaromatic compounds (asphaltenes), which are composed by 3 to 10 aromatic rings and a side chain having 3 to 15 carbon atoms, as well as some acid and basic polar groups with external heteroatoms such as sulfur, nitrogen, oxygen and metals (Ni and V).

In contrast, the products from the FCC process are both linear paraffins and branched olefins, which have a typical molecular weight within the range of gasolines (C8-C12+), as well as primary aromatic molecules with short alkyl chains (C2-C3) and naphthenic compounds.

Instead, heteroatoms (S and N) are associated to simple molecules such as thiophene and methylbenzothiophenes, which result mainly from the cracking and recombination processes in the FCC reactor. From a fundamental perspective, sulfured molecules that are present in FCC gasoline are characterized by their basic Lewis type character, namely a tendency to donate electrons, from the available electron pair of the sulfur atom, but the stability of the thiophenic ring causes a resistance towards the desulfurization reaction.

During the development of the present invention the primary criteria for designing effective adsorbents for contaminants removal were operating conditions such as T<30° C. and P=1 atm, in order to preserve the desirable properties of the FCC products, that is the octane number and olefin content in the liquid fraction (RON>85, Olefins>10%).

Moreover, mesoporous silicates with pore diameters within the interval 2 nm<$D_{pore}$<50 nm have been the subject of great interest in the last 15 years, because they have pore diameters of 3 to 50 times larger than the pore diameter of other materials such as zeolites (0.3 nm<$D_{Poro}$<1 nm). These features are very important as they allow the diffusion of more complex molecules such as those typically found in heavy crudes. However, the structural stability of these materials, for example MCM-41, MCM-48, MCM-50, MSU, SBA, etc., is a major limitation for some applications involving high temperatures and wet environments, i.e., T>400° C., RH>60%). Alternatively, the moderated conditions that are used in low severity processes, i.e., P=1 atm and T<100° C. with relative humidity (RH) of less than 50%, can be attractive for the application of these materials. Previous studies have reported the preparation of mesoporous materials from the cooperative interaction of molecules of ionic and non-ionic surfactants such as CTAB (Cetyl trimethyl ammonium bromide), Pluronic (Ethylene-propylene polyoxides) with chemical species in solution. Recently, J. M. Domínguez et al., reported the synthesis of porous materials with novel structures (Micr. Mesop Mater, 66 (2003) 341-348), consisting of silicate spheres with a radial distribution of interconnected pores. These materials have high specific areas, i.e., about 1,000 m$^2$/g. Also, other porous silicate structures consisted of particles with elliptical geometry and a set of channels that run perpendicular to the major axis, with thick walls between pores (i.e., thickness of the order of 3 nm), which are more resistant than conventional materials based on MCM-41 (i.e., E. Terrés et al., U.S. Patent 2004/0052714 A1).

Therefore, the knowledge obtained in the synthesis of nanostructured materials was used in the present development as a conceptual basis for their application in the modification of surface properties such as acidity (Lewis). The results covered by the present invention were obtained from a comprehensive experimental investigation, by considering a variety of chemical compounds in order to obtain potential adsorbents, which might be comparable or superior to some commercially available materials, with regard to its properties for removal of sulfur and nitrogen compounds from FCC gasoline.

DETAILED DESCRIPTION OF THE INVENTION

Figure 1:
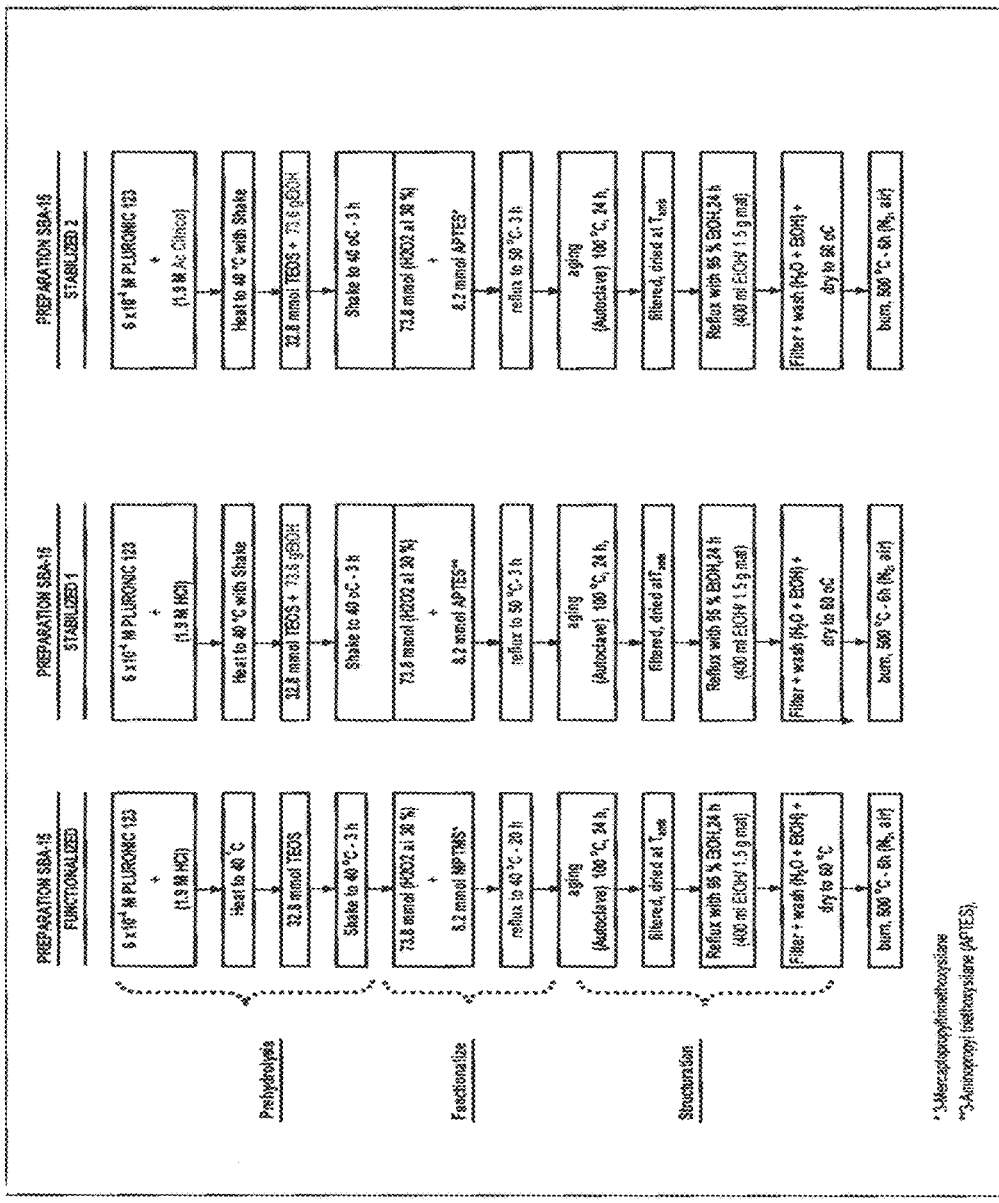
FIG. 1 is Table 2 showing the procedure of Example 1.

The present invention relates to novel porous materials based on silicates, as well as the process for obtaining them and using them in reduction of sulfur and nitrogen contaminants from petroleum fractions: light and heavy gas oils, gasoline and fuels, gasoline derived from FCC process (Fluid Catalytic Cracking).

The invention relates the use of such porous materials, which have high specific surface area (S>800 m$^2$/g), and are technically feasible, i.e., available precursors, non-toxic, and economically favorable, with respect to other products and processes; also, the invention relates with the procedure for obtaining useful active phases for the adsorption of sulfur and nitrogen compounds that are present in FCC gasoline, under low severity conditions, i.e., P=1 atm, T<100° C., which is of interest for reducing the sulfur and nitrogen contents in fuels, which could be massively produced for their application in refining operations, which tends to significantly reduce the concentration of sulfur and nitrogen in fuels, up to agreed limits within the predicted environmental legislation, respectively, thus contributing to comply environmental norms, i.e., less than 50 ppm sulfur and nitrogen; with this, social benefits may be derived such as improvement of human health and conservation of ecological environment, as well as economic development. From a technical viewpoint, the present invention uses the ability of some high specific surface area porous materials (i.e., S>800 m$^2$/g), with controlled surface acidity (i.e., A~40 μmol Py/g), to capture sulfur- and nitrogen molecules from FCC gasoline, which have typical properties of the more general Lewis bases. The materials have high specific areas in the range between 500 m$^2$/g and about 1,000 m$^2$/g, depending on the preparation conditions. They are constituted by a porous network with average pore diameters between 3 and 30 nm. This makes it possible to design new adsorbents and catalysts by functionalization, grafting or impregnation of the active phases in the porous materials, whose properties are geared specifically towards the applications described herein. The applications relate to the reversible adsorption of contaminant molecules that are present in the FCC type gasoline, such as thiophene and benzothiophene mainly, without limiting the possibility of including other applications that involve molecules with characteristics that make them typically electron donors, for example in processes of the food industry and for environmental control, water purification, bleaching of pigments, etc. In general, nitrogen compounds involving neutral nitrogen have not been studied properly because some difficulties in the separation and their identification; however, it is known that the primary amine content in the reduced crude is about 0.0064%, while secondary amines represent 0.0416%, and tertiary amines are about 0.0125 to 0.0450%. However, up to about 70% of nitrogen in the reduced crude has a neutral character and most of it (80%) is associated in the asphaltene/resins fraction. The analysis by gas chromatography mass spectrometry (GC-MS) indicates that most part of this nitrogen fraction appears in compounds such as quinoline and R-Pyridine Carbazols.

Therefore, the invention comprises the selection, preparation and modification and adsorptive properties of porous materials based on silicates that are intercalated and/or impregnated with metallic species such as $Ti(O,OH)_4^{4-}$, $Mg(O,OH)^-$, $Zr(O,OH)_4^{4-}$, $Fe(O,OH)_2^{2-}$, $Al(O,OH)_3^{3-}$. Also, additional alternatives were considered, for example by using metals from the 1st and 2nd transition series, such as $Cu^+$, $Ni^{2+}$, $Zn^{2+}$, $Fe^{2+}$, $Ag^+$, $Co^{2+}$, $Ti^{4+}$, $V^{2+,5+}$, $Cr^{3+}$ and $Mn^{2+}$.

The materials of the present invention exhibit absorption properties that are of interest for removal of thiophenic and benzothiophenic compounds, specifically for reducing the sulfur and nitrogen content in gasoline derived from the FCC process, i.e., up to about 75% by weight of synthetic gasoline and 90% FCC naphtha weight, which might have both a technical and economic impact in agreement with the environmental legislation limits regarding the sulfur content in fuel oils.

The present invention comprises the preparation of adsorbent materials that are based on the ordered mesoporous silicates and their modification by incorporation of some metallic cations from the late series of transition metals; also, their use involves the removal of contaminants containing sulfur and nitrogen, such as thiophene (mainly), benzothiophene, di-benzothiophene, quinoline, etc. which are common components of gasoline produced by the FCC process.

In summary, the novelty of this invention focuses on three points: preparation and modification of the ordered porous silicates, the incorporation and dispersion of metal cations (late transition series) and the unique properties of these materials for removal over 90% in weight, of molecules containing sulfur contaminants. The formulation for preparing the porous support is based on silicates that are obtained from sodium metasilicate and tetraethylorthosilicate (TEOS), which are prepared in aqueous solutions and then some metal cations are added, such as iron, zinc and nickel, from the salts described herein, which constitute a useful technology for removing sulfur and nitrogen contaminants from gasoline.

The present invention allows the modification of ordered mesoporous materials based upon SBA-15 type, by incorporating species of Fe, Zn, Ni, Ag and Cr.

The synthesis of these materials comprises certain steps known in the art for preparing catalysts and adsorbents by chemical methods, but the resulting product is new by its chemical composition, by its proper structural features, its texture and adsorptive properties, which are all the main characteristics of the materials of the present invention.

The materials comprising the present invention are porous silicates with symmetrical arrangements that are similar to MCM-41 and SBA-15 type materials, having a specific metal charge arising from their metal nature and which are not reported as such in other patents. Moreover, the adsorbent properties that occur in a high sulfur and nitrogen removal ratio make them different from other materials, then the present application is considered distinct of others and then it is original.

One further aspect of the present invention is the compatibility of the adsorbent material with the treating hydrocarbon fluid, which particularly occurs by a weak interaction with other molecules that could be modified by their interaction with the surface acceptor. A further aspect derives from the low reactivity of the adsorbents by themselves, regarding low reactivity with high octane gasoline molecules, such as more branched hydrocarbon paraffins and some olefins that are within the range of gasoline (C8-C12+) or aromatics, which are desirable compounds of gasoline, i.e., benzene and alkylbenzenes. In fact, the adsorbents of the present invention interact preferentially, but not exclusively, with molecules having a Lewis type basic character (i.e., electron donors); this gives them a potential selectivity for their use as adsorbents of sulfurous molecules and nitrogen-containing molecules, which are considered undesirable impurities of most of fuels, which may violate actual environmental laws.

In addition to the foregoing, the present invention improves the quality of FCC gasoline by reducing the content of thiophenic and benzothiophenic compounds in the liquid fraction, thus enabling compliance with environmental laws.

Other relevant aspect of the present invention is the possibility of regenerating the materials used, so that they can be reused after applying a mild process, thus contributing to their technical and economic feasibility. Moreover, the basic ingredients for the preparation of the adsorbents that are covered by the present invention are their inexpensiveness, reliability, low toxicity, compatibility with a number of liquid solvents having moderate to high polarity, and particularly with water.

The continuation of the current inertia in the control of pollutants in most of hydrocarbon fuels, could lead to increased corrosion effects of the oil infrastructure, which might impact higher operating costs and further replacement rates of the catalysts used in refining processes, due to their potential deactivation by sulfur contaminants in the hydrocarbon fuels. Additionally, the costs of non-compliance with environmental laws could generate important economic and legal sanctions.

Alternatively, it has been stated that the deep hydrodesulfurization (HDS) process of gas oils feeding the FCC process, the major source of gasoline, requires a modification of the premises of the refinery, i.e., an increase of the capacity of the HDT reactors to reduce the space velocity (LGHSV) and increase the contact time; however, that option involves a major capital investment. Therefore, the present invention contributes to the solution of this problem by capturing pollutants of sulfur and nitrogen in FCC products, in order to meet the environmental standards.

The present invention claims the use of materials whose properties are obtained by loading modified mesoporous silicates with metal species, which present an average pore diameter between 8 and 20 nm. Both, the size of the surface pores and their symmetry arrangement of pores, were determined by Transmission Electron Microscopy (TEM). The specific surface area of these materials is about 500 $m^2$ and its total pore volume is about 0.5 cc/g. The wall thickness between pores can be determined by the Fenelonov's method, which is typically between 1.5 and 2.5 nm. The concentration of Bronsted acid sites, as determined by IR spectroscopy of pyridine adsorption, is greater than 100 µmol (pyridine)/$g_{ads}$, 200° C.

Additionally, there was the inclusion of electron acceptor species, which are compatible with the silica network and/or non-crystalline silicates, which could promote the adsorption up to full saturation, of sulfurous and nitrogenous hydrocarbons, such as thiophenic and benzothiophenic species, mainly. Examples of the present invention are reported in the following sections, where their application and effectiveness are demonstrated through experimental measurements made by accurate chromatography in solution, thus ensuring the removal of nitrogen and sulfur species from the abovementioned FCC gasoline. Of course, the potential applications of these materials is not limited to this specific development but, on the contrary, it extends towards cases where the contaminant species are likely to change their degrees of freedom, from 3 to 2, by adsorbing on the materials that are covered by this invention.

The removal of the main sulfur and nitrogen pollutant species by adsorption, represents a technically feasible way, which is economically favorable, and it involves only selective capture of sulfur and nitrogen species in the FCC type gasoline. The adsorption process is carried out on porous materials whose adsorbing properties are capable of reducing the sulfur content and total nitrogen in the FCC product, from 1,000-1,500 ppm to the values allowed by environmental regulations (<50 ppm). This is a removal capacity greater than 90 wt %, more specifically greater than 96.6% wt, with respect to the base (1,500 ppm $S_{total}$). Additionally, the materials can be regenerated by mild treatments at moderate temperatures, thus allowing their recycling. Even more, being that the FCC gasoline is about 50% vol. of the FCC products, it is of great interest to keep the octane number equal to or better than the original product. These requirements claim for the use of available, low cost adsorbents, with surface properties that could favor the intermediates adsorption, that is to say, a weak adsorption energy, for limiting the conversion of olefins and also for promoting the materials regeneration. These features can be covered by a variety of porous materials as the ones abovementioned, which are based on silica, but alumina, aluminum silicates, natural and synthetic zeolites, metal oxides (MgO, $TiO_2$, $SnO_2$, $Fe_2O_3$, etc.) activated carbon and other materials can be proposed. However, being that the surface properties of the material are decisive, the invention covers the preparation and subsequent modification of mesoporous silica, whose structure is composed by unidirectional channels, whose diameters shall permit easy access to the complex intermediate chemical species, such as the ones that are typical of the sulfur related compounds in FCC gasoline. Under these conditions some microporous materials such as LTA type zeolites, SOD or HEU, are not suitable for the abovementioned application, due to their steric restriction that is imposed by their pore size. Alternatively, other materials comply with the conditions of higher pore size, but its high Bronsted type acidity also disqualifies them. Such is the case of zeolites whose $SiO_2/Al_2O_3$ ratio is high, between 2 and 10, or even higher, which includes all those materials having a ratio up to 20. Therefore, the essence of the present invention comprises the selection, preparation and modification of certain materials as described below, in order to exploit its high porosity and adsorptive properties, through appropriate modifications, which overall confer the desired properties for reducing the content of sulfur and nitrogen in the hydrocarbon fractions like light and heavy gas oils, gasoline and other fuels, such as gasoline derived from FCC process (Fluid Catalytic Cracking).

Therefore, the present invention relates to the application of the previous knowledge about the synthesis of porous materials using organic surfactants and polar co-solvents, which interact cooperatively with anions of silica (i.e., $Si(O,OH)^{4-}$) or other inorganic species in solution, such as $Ti(O, OH)_4^{4-}$, $Mg(O,OH)^-$, $Zr(O, OH)_4^{4-}$, $Fe(O, OH)_2^{2-}$, and $Al(O,OH)_3^{3-}$. Also, additional options are claimed, such as the use of the metals belonging to the $1^{st}$ and $2^{nd}$ transition series, such as $Cu^+$, $Ni^{2+}$, $Zn^{2+}$, $Fe^{2+}$, $Ag^+$, $Co^{2+}$, $Ti^{4+}$, $V^{2+,5+}$, $Cr^{3+}$ and $Mn^{2+}$.

DESCRIPTION OF THE PROCESS

The process for obtaining porous silicate-based adsorbents is described below; this is a procedure commonly used for preparation of the SBA type materials, but alternatively the present invention carried out some modifications and integration of different chemical species as exemplified in table No. 2.

Method of Preparing the Adsorbent Material

Dissolving an amount of Pluronic 123 (1.6×10−4 M, BASF) in water, simultaneously with a hydrochloric or citric acid solution in a concentration between 1 and 5 (molar) which is added to the solution containing the Pluronic and this mixture is heated to a temperature between 40 and 50° C., while keeping this temperature for about 1 h. TEOS is then added between 20 and 40 mmol; also, depending on the material to be processed one can add ethanol, and this mixture is kept under constant agitation for 3 h.

The next step is to add between 70 and 75 mmol of a 30% $H_2O_2$ solution and some inorganic species as mentioned above. This solution is still maintained under stirring at 40° C. for a period between 3 and 20 h.

Then the solution is passed to the aging step in autoclave, always maintaining a stirring and increasing the temperature up to 100° C. for a 24 h period.

Subsequently, one proceeds to a structuring step, wherein the material is filtered and dried, then it put in reflux, to eliminate non reacted compounds, which is done by using ethanol during a period of 24 h. The next step consisted of filtering and washing the material with ethanol, additionally drying in an oven at 60° C.

Finally, the material was calcined in air or nitrogen atmosphere for 6 h at 500° C.

Procedure of Use of the Adsorbent Material

The material thus obtained can be used to effect adsorption of nitrogen and sulfur in FCC gasoline. A typical test consists of pouring gasoline in a certain amount onto the adsorbent material, where the adsorption is carried out for during 15 to 30 min at room temperature; after this the fuel is filtered out and it is analyzed by gas chromatography, in order to determine the amount of sulfur and nitrogen remaining therein.

The results of these tests are shown in Table No. 7.

EXAMPLES

Example 1

A mesoporous silicate was prepared by acidifying with hydrochloric acid (1.9 M) an aqueous solution of non-ionic surfactant, i.e., the Pluronic-123 (tri-block-polymer based on Ethylene Oxide and Propylene Oxide, for example [OE] 20-[OP] 70-[OE] 20) at 6×10$^{-4}$ M, and 40° C.; this procedure produces a clear solution, which is added slowly with stirring the equivalent needed to obtain a ratio of 54.6 with respect to a source of silica (i.e., tetraethylorthosilicate TEOS) or sodium metasilicate. After stirring at 40° C. for 3 h, a process of aging is carried out using polypropylene bottles or autoclaving at 100° C. for 24 h; then filtering and drying at room temperature were carried out before proceeding with the extraction of surfactant by refluxing at 95° C. with ethanol (400 ml/1.5 g of material), for 24 h.

After washing with water and ethanol, the material is heated at 60° C., until complete dryness, then calcined at 500° C. for 6 h, under a nitrogen atmosphere initially and subsequently in air. The resulting materials were impregnated with aqueous solutions of mineral salts (for example the nitrates with radical $NO_3^-$) of some metals belonging to the $1^{st}$ and $2^{nd}$ transition series, such as $Cu^+$, $Ni^{2+}$, $Zn^{2+}$, $Fe^{2+}$, $Ag^+$, $Co^{2+}$, $Ti^{4+}$, $V^{2+}$, $V^{5+}$, $Cr^{3+}$ and $Mn^{2+}$. In particular, $Cu^+$, $Ni^{2+}$, $Ag^+$ and $Zn^{2+}$ were used preferentially. This procedure is illustrated in the Table No. 2.

Example 2

A porous substrate as described in Example No. 1 was used and impregnated for 6 h with aqueous solutions of mineral salts of $Ni^{2+}$, $Cu^+$ and $Ag^+$, with constant stirring and drying at 60° C., prior to calcination in air at 500° C. for 6 h. The resulting materials were tested as adsorbents of sulfur compounds that are commonly present in FCC type gasoline, which contain about 1,500 ppm total sulfur from a mixture of 50 wt % thiophene, 25 wt % dibenzothiophene (DBT) and 25% wt of 4-, 6-Dimethyldibenzothiophene (4-,6-DMDBT) in n-heptane, as shown in Table No. 3. The final effluent concentration indicates a substantial reduction in the sulfur content, up to about 97 wt % after 15 min, at room temperature (T=25° C.).

TABLE NO. 3

Sulfur Removal from synthetic gasolines

| Base 2% | % Removal | | |
|---|---|---|---|
| | Ni+ | Cu+ | Ag+ |
| Thiophene | 23 | 39 | 97 |
| DBT | 42 | 48 | 47 |
| DMDBT | 43 | 54 | 45 |

Example 3

A mesoporous silicate was prepared as described in Example No. 1, using an aqueous solution of an ionic surfactant, i.e., cetyltrimethylammonium bromide (4.5% wt). To these solutions it is added one of several co-solvents, such as some light alcohols, in particular the lightest ones, i.e., ethanol or propanol; more preferably, the addition of aprotic solvents was preferred, for example acetone, in the range 0.009≤(CTAB/Ac)≤0.023. Then, the Impregnation of mineral salts was performed, as described in the Example No. 2, which leads to the preparation of adsorbents that are particularly strong for sulfur adsorption from gasoline, i.e., more than 97% sulfur removal of thiophene from gasolines containing about 1,500 ppm S. The synthetic gasoline contained sulfur compounds spread over, with 50 wt % thiophene, 25 wt % dibenzothiophene (DBT) and 25 wt % 4-,6-dimethyldibenzothiophene (4-,6-DMDBT) in standard conditions (temperature, P=1 atm, t=15 min), as shown in Table No. 4.

TABLE NO. 4

Removal of sulfur from synthetic gasoline

| Base 2% | % Removal | | |
|---|---|---|---|
| | Ni+ | Cu+ | Ag+ |
| Thiophene | 71 | 81 | 98 |
| DBT | 21 | 35 | 31 |
| DMDBT | 26 | 35 | 23 |

Example 4

The material prepared as described in Example No. 1 was impregnated with aqueous solutions of inorganic hydrochloric and organic acids, i.e., HCl and citric acid, in order to use it as adsorbents from mixtures of thiophene, DBT and 4-,6-DMDBT, and nitrogen adsorbents from mixtures of pyridine/quinoline in n-heptane solutions; Table No. 5 illustrates the sulfur removal from heavy and light gasoils.

The content of sulfur and nitrogen in the respective fractions were reduced in both cases.

TABLE NO. 5

Removal of sulfur compounds from synthetic mixtures of (a) heavy gasoil, (b) Light gasoil.

| Base 2% | % Removal | | |
|---|---|---|---|
| | Ni+ | Cu+ | Ag+ |
| Thiophene | 25 | 31 | 35 |
| DBT | 15 | 17 | 18 |
| DMDBT | 4 | 9 | 4 |

| Base 2% | % Removal | | |
|---|---|---|---|
| | Ni+ | Cu+ | Ag+ |
| Thiophene | 61 | 67 | 74 |
| DBT | 11 | 6 | 10 |
| DMDBT | 16 | 8 | 11 |

Example 5

The adsorption of sulfur compounds from naphtha was performed using mesoporous materials that were prepared according to Example No. 1, which is effected by the direct adsorption of sulfur compounds from the liquid phase hydrocarbons. For this, metallic salts from the late transition elements of the periodic table were impregnated in the silicates support, then the material was calcined; for example but not exclusively, metals such as nickel, copper, zinc, palladium, silver and cadmium were used impregnation, more specifically those having a tendency to form complex chemicals such as those described herein, including iron. These materials have properties for removal of sulfur compounds, up to about 75.4 wt % in static conditions and at normal temperature (25° C.) and pressure (1 atm). Supplementary, materials that are listed above, containing silver and copper cations, exceed this 75.4 wt % of sulfur removal, as shown in Table No. 6.

TABLE NO. 6

Removal of sulfur compounds from synthetic hydrocarbon mixtures, using different adsorbents containing metallic cations.

| Base 5% | % Removal | | |
|---|---|---|---|
| | Ni+ | Cu+ | Ag+ |
| Thiophene | 63 | 74 | 75 |
| DBT | 13 | 10 | 3 |
| DMDBT | 19 | 11 | 8 |

TABLE NO. 7

Tests nitrogen and sulfur removal by the adsorbent materials based on silicates and metals (Fe, Ag, Cu)

| | Nitrogen | | | | | | Sulphur | | Hydrocarbon | |
|---|---|---|---|---|---|---|---|---|---|---|
| 1% | Total Area | Reduction % | basic N | Reduction % | Non basic N | Reduccion % | Total Area | Reduction % | Total Area | Reduction % |
| NF | 200606121 | | 181535149 | 0.00 | 19070972 | 0.00 | 1.60E+05 | 0.00 | 2.52E+06 | 0.00 |
| Fe | 127797314 | 36.29 | 126443253 | 30.35 | 1354061 | 92.90 | 1.11E+05 | 30.74 | 2.46E+06 | 2.61 |
| Ag | 110945084 | 44.70 | 108321706 | 40.33 | 2623378 | 86.24 | 1.25E+05 | 22.26 | 2.38E+06 | 5.74 |
| Cu | 123603044 | 38.39 | 122065751 | 32.76 | 1537293 | 91.94 | 1.10E+05 | 31.38 | 2.38E+06 | 5.78 |
| | | | | | | | Sulphur | | Hydrocarbon | |
| 2.00% | Total Area | Reduction % | basic N | Reduction % | Non basic N | Reduccion % | Total Area | Reduction % | Total Area | Reduction % |
| NF | 166312664 | 0.00 | 144367460 | 0.00 | 21945203.5 | 0.00 | 1.75E+05 | 0.00 | 2.32E+06 | 0.00 |
| Fe | 129395397 | 22.20 | 128603969 | 10.92 | 791428 | 96.39 | 1.47E+05 | 16.00 | 2.35E+06 | −1.07 |
| Ag | 142493934 | 14.32 | 132778835 | 8.03 | 9715099 | 55.73 | 1.48E+05 | 15.43 | 2.35E+06 | −1.38 |
| Cu | 111313752 | 33.07 | 108736345 | 24.68 | 2577407 | 88.26 | 1.60E+05 | 8.75 | 2.36E+06 | −1.45 |
| | | | | | | | Sulphur | | Hydrocarbon | |
| 5.00% | Total Area | Reduction % | basic N | Reduction % | Non basic N | Reduccion % | Total Area | Reduction % | Total Area | Reduction % |
| NF | 183459392 | 0.00 | 162951305 | 0.00 | 20508087.8 | 0.00 | 3.04E+05 | 0.00 | 2.60E+06 | 0.00 |
| Fe | 113997608 | 37.86 | 113997608 | 30.04 | 0 | 100.00 | 2.60E+05 | 14.60 | 2.63E+06 | −1.27 |
| Ag | 93848077 | 48.85 | 89587456 | 45.02 | 4260621 | 79.22 | 2.57E+05 | 15.47 | 2.44E+06 | 6.15 |
| Cu | 131434413 | 28.36 | 130821571 | 19.72 | 612842 | 97.01 | 2.53E+05 | 16.93 | 2.49E+06 | 4.04 |
| SBA0% | 103783829 | 43.43 | 102334538 | 37.20 | 1449291 | 92.93 | 2.47E+05 | 18.70 | 2.37E+06 | 8.63 |

The Table No. 7 illustrates the sulfur and nitrogen variations in the hydrocarbon fluid before and after the adsorption treatment, using the materials of this invention.

Example 6

Some base materials were prepared by the methods described in the abovementioned examples, which consisted of impregnating the modified silicate based supports with the nitrate salts, and 0.1 to 10% (wt) metals content, more preferably between 0.5 and 1% wt, on average, the cations being $Cu^+$, $Ni^{2+}$, $Zn^{2+}$, $Fe^{2+}$, $Ag^+$, $Co^{2+}$, $Ti^{4+}$, $V^{2+,5+}$, $Cr^{3+}$; these materials were calcined at the temperature indicated in the context of the present invention (500° C.), in accordance with previously reported data. These materials were put in contact with FCC type naphtha, which, after a few minutes, was analyzed by gas chromatography, according to the data reported in Table No. 8.

TABLE NO. 8

Properties of materials based on the modified porous silicates for removing sulfur compounds from gasoline

| Materials(*) | % Sulfur removal |
|---|---|
| Naphtha FCC (original) | — |
| IMPSB-Zn | 83.3 |
| IMPSB-Ni | 74.3 |
| IMPSB-Fe | 91.4 |
| IMPSB-Cu | 28.7 |

(*)materials based on porous silicates with different metals supported

Therefore, it follows that the adsorbent materials, prepared as reported in the present invention in Example No. 1, possess unique properties such as a high capacity for sulfur and nitrogen removal from gasoline at ambient conditions (P=1 atm, T~25° C.), which contributes to its use for reducing sulfur and nitrogen contaminants that are commonly found in FCC gasoline, such as thiophene, benzothiophene, etc.

The invention claimed is:

1. A process for reducing a sulfur and nitrogen content of a petroleum fraction or product derived therefrom, comprising the steps of:
   contacting the petroleum fraction or product derived therefrom with a porous silicate adsorbent containing at least one metal selected from the group consisting of Cu, Ni, Sn, Fe, Ag, Co, Ti, V, Cr, and Mn; and
   adsorbing and removing sulfur and/or nitrogen compounds from said petroleum fraction or product derived therefrom.

2. The process of claim 1, wherein said petroleum fraction or product derived therefrom is gasoline obtained from a fluid catalytic cracking (FCC) process.

3. The process of claim 2, further comprising contacting said gasoline with said porous silicate adsorbent at a temperature of 100° C. or less.

4. The process of claim 3, wherein said gasoline is contacted with said porous silicate adsorbent at a pressure of about 1 atm.

5. The process of claim 2, further comprising contacting said gasoline with said porous silicate adsorbent at room temperature for about 15 to 30 minutes.

6. The process of claim 1, wherein the porous silicate adsorbent has a surface area of 500-1000 $m^2/g$.

7. The process of claim 1, wherein the porous silicate adsorbent has a surface area greater than 800 $m^2/g$.

8. The process of claim 1, wherein the porous silicate adsorbent has a surface area greater than 1,000 $m^2/g$.

9. The process of claim 1, wherein said porous silicate adsorbent has an average pore diameter of about 3 to 30 nm.

10. The process of claim 1, wherein the petroleum fraction or product derived therefrom is gasoline obtained by a fluid catalytic cracking process, and said process reduces the sulfur and nitrogen content by about an amount greater than 96.6% wt.

11. The process of claim 1, wherein said porous silicate adsorbent is obtained by a process comprising the steps of:
dissolving an amount of an EO/PO tri-block polymer in water, adding a 1-5 molar solution containing hydrochloric or citric acid to form a first mixture;
heating the first mixture to about 40-50° C.;
adding to said first mixture about 20 to 40 mmol TEOS, under constant stirring to obtain a first reaction product,
adding to the first reaction product a $H_2O_2$ solution containing a nitrate of a metal cation selected from the group consisting of $Cu^+$, $Ni^{2+}$, $Zn^{2+}$, $Fe^{2+}$, $Co^{2+}$, $Ti^{4+}$, $V^{2+}$, $V^{5+}$, $Cr^{3+}$ and $Mn^{2+}$ or an inorganic compound containing a metal selected from the group consisting of Ti, Mg, Zn, Fe, and Al under stirring for a period between 3 and 20 h;
aging the resulting solution in an autoclave with stirring while raising the temperature to 100° C. or less;
filtering and drying the resulting material, and removing non-reacted compounds by rinsing with ethanol for a period of 24 hr;
filtering and washing the resulting material, and drying the material in an oven; and
calcining the dried material in air or nitrogen atmosphere to obtain the porous silicate adsorbent, wherein integrated materials are formed by a metal-silicate complex, and wherein said porous silicate adsorbent has an average pore diameter of 3-30 nm and a wall thickness between pores of 1.5-2.5 nm.

12. The process of claim 11, wherein said petroleum fraction or product derived therefrom is gasoline obtained by a fluid catalytic cracking process, and said adsorption of nitrogen and sulfur-containing molecules is carrier out at a temperature of less than 100° C., and a pressure of 1 atm without changing an octane number of the gasoline.

13. The process of claim 11, wherein said process further comprises impregnating said calcined porous silicate adsorbent with an aqueous solution of a nitrate ($NO^{3-}$) containing metal cation selected from the group consisting of $Cu^+$, $Ni^{2+}$, $Zn^{2+}$, $Fe^{2+}$, $Ag^+$, $Co^{2+}$, $Ti^{4+}$, $V^{2+,5+}$, $Cr^{3+}$ and $Mn^{2+}$.

14. The process of claim 11, wherein said process further comprises impregnating said calcined porous silicate adsorbent with a aqueous solution of a nitrate ($NO^{3-}$) containing a metal cation selected from the group consisting of $Cu^+$, $Ni^{2+}$, $Ag^+$ and $Zn^{2+}$.

15. A process for reducing a sulfur and nitrogen content of a petroleum fraction or product derived therefrom, comprising the steps of:
contacting the petroleum fraction or product derived therefrom with a porous silicate adsorbent containing at least one metal selected from the group consisting of Cu, Ni, Sn, Fe, Ag, Co, Ti, V, Cr, and MN; and
adsorbing and removing sulfur and/or nitrogen compounds from said petroleum fraction or product derived therefrom; and
where said porous silicate adsorbent is obtained by a process comprising the steps of:
dissolving an amount of an EO/PO tri-block polymer in water, and adding a 1-5 molar citric acid solution to form a first mixture and heating the resulting first mixture;
adding about 20 to 40 mmol TEOS to said first mixture to obtain a first reaction product, under constant stirring;
adding to said first reaction product a $H_2O_2$ solution containing a nitrate of a metal cation selected from the group consisting of $Cu^+$, $Ni^{2+}$, $Zn^{2+}$, $Fe^{2+}$, $Co^{2+}$, $Ti^{4+}$, $V^{2+}$, $V^{5+}$, $Cr^{3+}$ and $Mn^{2+}$ or an inorganic compound containing a metal selected from the group consisting of Ti, Mg, Zn, Fe and Al under stirring for between 3 and 20 h, aging the resulting solution in an autoclave with stirring while raising the temperature to 100° C. or less;
filtering and drying the resulting material;
removing non-reacted compounds by rinsing;
filtering and washing the resulting material, and drying the material in an oven; and
calcining the material in air or nitrogen atmosphere to obtain the porous silicate adsorbents having a surface area of 500-1000 $m^2/g$, an average pore diameter of 3-30 nm, and a wall thickness between pores of 1.5-2.5 nm, wherein integrated materials are formed by a metal-silicate complex.

16. The process of claim 15, wherein
said first mixture of said EO/PO tri-block polymer and citric acid is heated at a temperature of about 40-50° C.

17. The process of claim 15, wherein
said $H_2O_2$ solution is a 30% $H_2O_2$ solution and is added in an amount of about 70 to 75 mmol.

18. The process of claim 15, wherein
said material is dried at a temperature of about 60° C. and calcined at a temperature of about 500° C. for about 6 hours.

19. The process of claim 15, wherein said first mixture consists essentially of said citric acid solution and said EO/PO tri-block polymer.

20. The process of claim 15, wherein said petroleum fraction or product derived therefrom is gasoline obtained by a fluid catalytic cracking process, and where said sulfur compounds are thiophene or benzothiophene compounds.

\* \* \* \* \*